United States Patent
Choiniere, Sr.

(10) Patent No.: US 8,364,563 B2
(45) Date of Patent: Jan. 29, 2013

(54) SYSTEM AND METHOD FOR STANDARDIZING ACCOUNTING OF CONSUMABLES

(75) Inventor: Michael A. Choiniere, Sr., Warwick, RI (US)

(73) Assignee: Car Parts, Inc. Color Systems, Warwick, RI (US)

( * ) Notice: Subject to any disclaimer, the term of this patent is extended or adjusted under 35 U.S.C. 154(b) by 647 days.

(21) Appl. No.: 12/248,171

(22) Filed: Oct. 9, 2008

(65) Prior Publication Data

US 2009/0157535 A1 Jun. 18, 2009

Related U.S. Application Data

(60) Provisional application No. 60/979,207, filed on Oct. 11, 2007.

(51) Int. Cl.
*G07B 17/00* (2006.01)
*G07F 19/00* (2006.01)
*G06G 1/14* (2006.01)
*G06Q 20/00* (2012.01)
*G06Q 10/00* (2012.01)

(52) U.S. Cl. ................. 705/30; 705/22; 705/28
(58) Field of Classification Search ............ 705/22–30
See application file for complete search history.

(56) References Cited

U.S. PATENT DOCUMENTS

| | | | |
|---|---|---|---|
| 5,153,825 | A | 10/1992 | Yauk |
| 5,317,503 | A * | 5/1994 | Inoue ............... 700/90 |
| 6,263,322 | B1 * | 7/2001 | Kirkevold et al. ......... 705/400 |
| 6,575,365 | B1 | 6/2003 | Bourne |
| 6,805,292 | B2 | 10/2004 | Bourne |
| 6,858,691 | B2 | 2/2005 | Armand |
| 7,389,276 | B1 * | 6/2008 | Barnard et al. ............. 705/400 |
| 7,487,018 | B2 * | 2/2009 | Afshar et al. ............. 701/29.6 |
| 7,654,456 | B2 * | 2/2010 | Roewer ....................... 235/385 |
| 2003/0050830 | A1 * | 3/2003 | Troyer ......................... 705/11 |

(Continued)

OTHER PUBLICATIONS

Macon, Georgia, ComputerLogic Launches PMCLogic and PMCLink, ComputerLogic, Inc., Feb. 14, 2003, obtained from http://www.computerlogic.com/news/templates/press_release.asp?articleid=89&zoneid=1 on Jun. 29, 2007.

(Continued)

*Primary Examiner* — Ig T An
(74) *Attorney, Agent, or Firm* — Lando & Anastasi, LLP

(57) ABSTRACT

According to one aspect, the system for standardizing accounting of consumables provides material lists of consumables used in particular repairs. The development of the material lists takes place through tracking of consumables used during the repair of various parts of different types of automotive vehicles. The size, shape, time, and material for repair may vary by make and model of vehicle, as well as the characteristics associated with each make and model. Once a materials list for a reasonable repair is assembled, the process is repeated for each vehicle make, model, and part to be repaired. The end result is a material list template for each part that a body shop repairs. In one embodiment, a wholesaler maintains and provides access to a system for standardizing accounting to body shops. The interface is customized for each body shop, so that specific materials will be provided on the material list for a repair. In another embodiment, user selectable options provide brand selection for the materials used in a particular repair. Providing brand selections and/or restricting selection of brand may provide an incentive for material purchases into specific brands. According to another aspect, maintaining material lists for each any every part of each model and make of vehicle represents significant overhead for any service provider. Creating standardized automobile objects for use in conjunction with a system for standardizing accounting of consumables provides for easier maintenance and greater flexibility to updates.

30 Claims, 15 Drawing Sheets

U.S. PATENT DOCUMENTS

| | | | |
|---|---|---|---|
| 2003/0111525 A1* | 6/2003 | Sweeney et al. | 235/376 |
| 2003/0154111 A1* | 8/2003 | Dutra et al. | 705/4 |
| 2003/0171981 A1* | 9/2003 | Bargnes et al. | 705/11 |
| 2005/0154647 A1 | 7/2005 | Bourne | |
| 2005/0240492 A1* | 10/2005 | Grdina | 705/26 |
| 2006/0184383 A1* | 8/2006 | Davis et al. | 705/1 |
| 2007/0011041 A1 | 1/2007 | Bourne | |
| 2007/0032965 A1* | 2/2007 | McClanahan et al. | 702/32 |
| 2007/0179869 A1* | 8/2007 | Cochrum | 705/29 |

OTHER PUBLICATIONS

Bailey, Paul, Charge for What you Do, BodyShop Business, Mar. 2003 issue, obtained from http://www.computerlogic.com/news/templates/pmclogic.asp?articleid=97&zoneid=13 on Jun. 29, 2007.

Yurek, Patrick, If You Do It, Charge for It, BodyShop Business, obtained from http://www.computerlogic.com/news/templates/pmclogic.asp?articleid=62&zoneid=13 on Jun. 29, 2007.

Burrow, Bruce, Get Paid for Your Work, Automotive Body Repair News, Feb. 1, 2001, downloaded from http://www.abrn.com/abm/content/printContentPopup.jsp?id=19873 on Jun. 29, 2007.

Pangaea PBEpro, Inventory software for PBE jobbers and distributors, downloaded from http://www.pbepro.net/ on Jun. 29, 2007.

Jhenn5, PBE Jobber-Management, downloaded from http://www.jhennsys.com/jhenn5.htm on Jun. 29, 2007.

Perfection Software, Inc. Screen captures downloaded from http://www.perfectionsoftware.com/ on Jun. 29, 2007.

Screen Captures from PMCLogic Demo retrieved through archive.org images of www.pmclogic.com retrieved on Jun. 29, 2007.

* cited by examiner

Correct Collect

| Home | About Correct Collect | Contact |

Vehicle Information

Repair Info > Repair Vehicle

Vehicle Type — 502
○ Car  ○ Truck

508 — Paint Type
○ Base/Clear Coat  ○ 3-Stage

Paint Color

[— Select One —  ▼]

512 — [Next]      ← 510

Correct Collect

| Home | About Correct Collect | Contact |

Vehicle Information

Repair Info > Repair Vehicle

502 — Vehicle Type
● Car  ○ Truck

504 — Car Size
● Compact  ○ Intermediate  ○ Large

506 — Door Style
● 2-Door  ○ 4-Door  ○ Hatch Back  ○ 4-Door Wagon

508 — Paint Type
○ Base/Clear Coat  ○ 3-Stage

Paint Color

[— Select One —  ▼]

512 — [Next]      ← 510

FIG. 5B

Correct *Collect* — 540

| Home | About Correct Collect | Contact |

Repair Detail Information
Repair Info > Repair Vehicle > Repair Detail

Next — 570

☐ Front Bumper — 542

☐ Hood

☐ Left Fender

544 — ☑ Right Fender   ⦿ Repair   ◯ Replace   ◯ Blend — 546
◯ Blend   ◯ Full Paint — 548

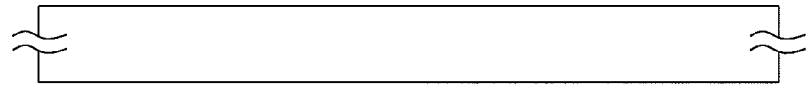

☐ Left Front Door

☐ Left Front Rocker Panel

☐ Right Front Door

☐ Right Front Rocker Panel

☐ Left Rear Door

☐ Left Rear Rocker Panel

☐ Right Rear Door

☐ Right Rear Rocker Panel

☐ Left Quarter Panel

☐ Right Quarter Panel

☐ Roof

☐ Deck Lid

☐ Rear Body Panel

☐ Rear Bumper

Next — 570

*FIG. 5D*

580 — Correct Collect

| Home | About Correct Collect | Contact |

Repair Totals

Repair Info > Repair Vehicle > Repair Detail > Repair Total

584 — Add Additional Items to Repair    Repair Items by Vehicle Part    View Print/Invoice
                                         586                              588

Repair Summary
  Right Fender (Repair-Blend)
  Repair Items Summary                                          582

| Item Number | Item Description | Item Quantity | Item Price | Extended Price | |
|---|---|---|---|---|---|
| 1028 | Washprimer | 1.0 OZ. | $1.18 | $1.18 | Remove |
| 1175 | Autoclear HS | 10.0 OZ. | $1.59 | $15.92 | Remove |
| 6040 | Wax and Grease Remover | 4.0 OZ. | $0.29 | $1.15 | Remove |
| 28004 | Water Based Autoclean | 4.0 OZ. | $0.35 | $1.40 | Remove |
| AutobasePlus2-1 | Three Stage Color | 200.0 ML | $0.10 | $20.67 | Remove |
| 1020 | Primer Surface | 3.0 OZ. | $1.66 | $4.64 | Remove |
| 1021 | Primer Sealer | 2.5 OZ. | $1.13 | $3.67 | Remove |

*Above products are ready-to-spray pricing, which includes hardeners, reducers or activators where applicable.*

| Item Number | Item Description | Item Quantity | Item Price | Extended Price | |
|---|---|---|---|---|---|
| 072 | Std. Wheel Maskers | 1.0 BG | $0.56 | $0.56 | Remove |
| 00803 | 36 Long Board | 0.5 EA | $1.78 | $1.07 | Remove |
| 1001 | Spot Weld Pins | 10.0 EA | $0.04 | $0.40 | Remove |
| 06377 | 1/2 Double Face Tape | 1.0 FT | $0.69 | $0.69 | Remove |
| 05910 | Texture Spray | 2.0 OZ. | $0.76 | $1.52 | Remove |
| 50C | Spray Glass Cleaner | 1.0 OZ. | $0.21 | $0.21 | Remove |
| 05824 | Glaze Putty | 3.0 OZ. | $1.04 | $3.12 | Remove |
| 741 | Acid Spray Primer | 2.0 OZ. | $2.82 | $6.64 | Remove |
| 06297 | 1/2" Soft Aperture Tape | 8.0 FT | $0.23 | $1.83 | Remove |
| 38378 | Car Soap | 1.0 OZ. | $0.10 | $0.10 | Remove |
| 0805 | 3" Weld Tabs | 0.5 EA | $11.47 | $5.74 | Remove |
| 02670 | 180 Long Board | 0.6 EA | $1.04 | $0.62 | Remove |
| 107 | Premium Body Filler | 3.0 OZ. | $0.30 | $0.91 | Remove |
| 00770 | 800 DA Paper | 0.5 EA | $1.33 | $0.67 | Remove |
| 07745 | Beige Scuff Pad | 0.5 EA | $1.69 | $0.80 | Remove |
| 00801 | 80 Long Board | 0.6 EA | $1.19 | $0.71 | Remove |
| 359 | Body Filler Hardener | 1.0 OZ. | $1.32 | $1.32 | Remove |
| 00769 | 1000 DA paper | 0.5 EA | $1.33 | $0.67 | Remove |
| 18W | 18" White Masking Paper | 8.0 FT | $0.08 | $0.60 | Remove |
| 06541 | 3/4 Masking Tape | 18.0 FT | $0.02 | $0.45 | Remove |
| 00783 | 80 DA Paper | 1.0 EA | $1.08 | $1.08 | Remove |
| 05703 | Double Buff Pad | 1.0 EA | $0.79 | $0.79 | Remove |
| 06054 | Machine Glaze III | 1.0 OZ. | $0.79 | $0.79 | Remove |
| 05936 | Rough Perfect It III | 1.0 OZ. | $0.86 | $0.86 | Remove |
| 0S34 | 3X4 Spreader | 1.0 EA | $0.40 | $0.40 | Remove |
| 06385 | 1/4 Double Face Tape | 0.6 FT | $8.89 | $4.45 | Remove |
| 02044 | 2000 Wet Paper | 0.5 EA | $0.72 | $0.36 | Remove |
| 06070 | Trizact Glaze | 1.0 OZ. | $0.85 | $0.85 | Remove |
| 06543 | 2" Masking Tape | 5.0 FT | $0.06 | $0.06 | Remove |
| 02691 | 320 Continous Paper | 0.6 FT | $0.41 | $0.26 | Remove |
| 06066 | Finish Glaze III | 1.0 OZ. | $0.50 | $0.50 | Remove |
| 05974 | Perfect It II Compound | 1.0 OZ. | $0.30 | $0.30 | Remove |
| 06295 | Flat Aperture Tape | 4.0 FT | $0.57 | $2.28 | Remove |

| | | | | |
|---|---|---|---|---|
| 00776 | 320 DA Paper | 1.0 EA | $0.90 | $0.90 Remove |
| 38351 | Purpose Cleaner | 9.0 OZ. | $0.21 | $1.93 Remove |
| 02023 | 1500 Wet Paper | 0.5 EA | $0.72 | $0.36 Remove |
| 16024 | Large PPS Cups | 1.0 EA | $2.51 | $2.51 Remove |
| 9437 | Scratch & Chip Brush | 1.0 EA | $1.00 | $1.00 Remove |
| 16134 | Mini RPS Cups | 2.0 EA | $1.60 | $3.20 Remove |
| 010608 | Nylone Paint Strainers | 4.0 EA | $0.65 | $2.59 Remove |
| 8000P | Pint Can | 2.0 EA | $0.89 | $1.79 Remove |
| DT5-53 | Lacquer Thinner | 32.0 OZ. | $0.06 | $2.00 Remove |
| AKZ123TC | Tack Rag | 2.0 EA | $1.66 | $3.32 Remove |
| CGC111-6 | Spray Gun Cleaner | 5.0 OZ. | $0.10 | $0.51 Remove |
| 33933 | Painters Paper Wipe | 12 EA | $0.18 | $2.20 Remove |
| 1030 | Acid Brushes | 2.0 EA | $0.09 | $0.18 Remove |
| 38375 | Wheel Cleaner | 8.0 OZ. | $0.15 | $1.22 Remove |
| QTCUP | Plastic Quan Cups | 2.0 EA | $0.80 | $1.60 Remove |
| 16000 | Medium PPS Cups | 2.0 EA | $1.94 | $3.87 Remove |
| 33845-50 | General Paper Wipe | 10 FT | $0.06 | $0.59 Remove |
| 3035 | Razor Blades | 4.0 EA | $0.08 | $0.34 Remove |
| 07184 | Pink Bodyman Filters | 2.0 EA | $0.97 | $1.94 Remove |
| LB900B-10 | Recycle Bag | 1.0 BG | $3.80 | $3.80 Remove |
| 07046 | Cartridges | 1.0 EA | $1.11 | $1.11 Remove |
| 07194 | Pre Filters | 1.0 EA | $1.89 | $1.89 Remove |
| 06728 | Car Cover Sheeting | 26.0 FT | $0.14 | $3.74 Remove |
| 07178 | Mad Respirator | 2.0 EA | $0.98 | $1.96 Remove |
| | | | Total | $138.68 |

590 → Sub Total: $138.68
Tax: $9.71
Repair Total: $149.39
Total Insurance Amount Allowed: ($93.75)
Remainder to be Collected: $54.64

FIG. 5F(2)

SYSTEM AND METHOD FOR STANDARDIZING ACCOUNTING OF CONSUMABLES

RELATED APPLICATIONS

This application claims priority under 35 U.S.C. §119(e) to U.S. Provisional Application Ser. No. 60/979,207, entitled "SYSTEM AND METHOD FOR STANDARDIZING ACCOUNTING OF CONSUMABLES," filed on Oct. 11, 2007, which is herein incorporated by reference in its entirety.

FIELD OF THE INVENTION

The invention relates generally to systems and methods for standardizing accounting for consumables.

BACKGROUND OF THE INVENTION

Automotive repair can be broken down into two broad categories. Repair to restore the functionality of a vehicle and repair to restore the appearance. With respect to functional repairs, identifying the cost of the repair is a relatively straight forward process. The repair will typically require a new or used part to replace a damaged one at a certain cost and will require a certain number of hours to complete the replacement. In such a repair, the tools used to remove and replace parts are not consumed and are typically not factored into the cost of individual repairs.

In contrast, body work (appearance restoration) on a vehicle utilizes a number of consumables in order to complete repairs. Certain consumables are used in almost every repair. Tape, in varying lengths, is employed in almost every repair that requires painting, the use of a scuff pad to prepare a surface to paint and a finishing pad to finish the painted area are almost universal. However these consumables are not as easily accounted for as items in a parts repair. Some of the consumables are not consumed in one repair but wear down over multiple repairs, making the accounting for such items difficult at best.

Increasing the complexity of the accounting problems are the regulations that govern reimbursement for automotive repair. Typically each state issues regulations governing the relationship between a consumer (automobile owner) a body shop and the insurance provider for the consumer. Additional parties may include wholesalers who provide the parts used in repairs, who may also acts as Jobbers (distributors of repair work). Generally, the regulations provide for the direct reimbursement of provable costs and indirect reimbursement in the form of a fair markup value for labor hours. Provable costs are costs in the form of materials that can be directly proven are used in the course of an ordinary repair. Typically such provable costs take the form of an amount of paint used to cover a particular body part, for example a front corner panel and the amount of paint used to blend, in other words, the paint used to make the new part color blend in with the paint color of the vehicle. A blend area is usually required where fresh paint is applied as a body shop can not perfectly match the car's color, but by getting the color as close as possible and blending the area between the fresh paint and old, the typical consumer can not detect the slight variation in tint.

Conventionally body shops are reimbursed for consumables used in such repairs at a specific rate set by insurance companies over the number of labor hours. Body shops, typically don't measure the amount of tape used, account for the life of a scuff pad, or the life of a finish pad used in the particular repair. Convention dictates that the body shop recover the costs of these items by adding a fair markup value to the hours required to paint. As insurance companies set this value, and control its' resetting, body shops are often left with un-reimbursed costs for consumables that directly impact their bottom line.

Certain systems have attempted to turn consumable costs into directly reimbursed costs. Such systems typically require the body shop worker to account for each and every item used in a repair, prepare an invoice to the insurance company based on the tracked usage of items, and bill accordingly. Such systems have seen limited adoption in the marketplace, because in one respect the burden is placed entirely on the body shop worker/manager to track for example, each inch of tape used, each sheet of sandpaper, among other consumables, making accurate tracking/billing more burdensome and/or costly than indirect reimbursement.

SUMMARY

By implementing the method or systems for standardizing accounting of consumables, various embodiments of the present invention overcome some of the shortcomings of conventional accounting systems.

According to one aspect, the system for standardizing accounting of consumables provides material lists of consumables used in particular repairs. The development of the material lists takes place through tracking of consumables used during the repair of various part of different types of automotive vehicles. For example, a compact car quarter panel will be smaller than a front quarter panel of a light duty truck and thus require less material (paint, tape, life of pad, etc.). The size, shape, time, and material for repair may also vary by make and model of vehicle, as well as details associated with each make an model. Once a materials list for a reasonable repair is assembled, the process is repeated for each vehicle make, model, and part to be repaired. The end result is a material list template for each part that a body shop repairs, that in one embodiment includes a standard/reasonable quantity for each item involved in a particular repair.

According to one aspect, providing a material list template generates predictability for reimbursement of consumable items. Preventing alternation of the material list templates, which in some embodiments include quantities for materials used, places control of the reimbursements in the hands of the system operator and not the party doing the work. In some examples such control may be maintained by the party paying the reimbursements. In one embodiment, enabling the party doing the work to vary the material list template within a predetermined threshold provides additional shop advantages. For example a body shop operator is able to get more representative reimbursement, and the reimburser is assured by a level of control that they themselves may establish.

Insurance reimbursement is heavily driven by expectations of insurers. Insurance models typically strive to find an average cost for repair, where some cost more and some cost less, but using the average cost the insurance company can effectively predict how much will be spent on a repair given a probability that particular repair is necessary. Thus, the templates are based on actual measurements but may deviate slightly from individual repairs based on average reasonable repair use of consumables. The concept of "reasonable repair" also shields the insurance company from inefficiencies on the part of a particular body shop, or excessive repairs.

According to one embodiment, built into the reasonable repair calculation for each part and materials list is some leeway that can be agreed to in advance between an insurance company and a wholesaler who distributes jobs to various body shops, or between an insurance company and a body shop. In another embodiments, such additional costs can be approved or rejected on a case by case basis. The leeway provides the ability to add or remove some material that may be needed in addition to the customary repair, but may also constrain a body shop to a reasonable repair reimbursement with a percentage adjustment where necessary. Certain insurance providers may require that there is no adjustment to the reasonable repair, counting on the reasonable repair to provide fair compensation over multiple repairs (some repairs cost less and some cost more).

According to one aspect, control over repair templates and consumable material lists resides with a wholesaler who distributes jobs to body shops. In one embodiment, the wholesaler retains a number of licenses to be used to by particular body shops and may customize the templates that are presented based on each particular body shop, or groups of shops. By maintaining control of material lists, repair templates and quantities, the wholesaler is provided the opportunity to direct materials purchases into products that are not only provided by the wholesaler but also have the greatest profit margin. Wholesalers and body shop can enter into mutually beneficial agreements, where the body shop agrees to use particular products sold by the wholesaler, and in return the wholesaler agrees to provide a minimum number of repair requests, for example.

In one embodiment, a wholesaler maintains and provides access to a system for standardizing accounting to body shops. The interface is customized for each body shop, so that specific materials will be provided on the material list for a repair. In another embodiment, user selectable paint options (typically by color and type) indicate a specific brand that is available for each. Other embodiments provide brand selections for each consumable item. Providing brand selections and/or restricting selection of brand serves a dual purpose, a wholesaler may provide an incentive for material purchases into specific brands and the body shop receives more complete compensation for a particular repair.

According to another aspect, maintaining material lists for each any every part of each model and make of vehicle represents significant overhead for any service provider. Creating standardized automobile objects for use in conjunction with a system for standardizing accounting of consumables provides for easier maintenance and greater flexibility to updates. In one embodiment, vehicle constants are established. Vehicle constants are items that are always used in a particular repair. In one example, wheel maskers are always employed when the repair involves a full paint of the vehicle. Wheel maskers shield the tire and rim from paint and or debris during the course of a repair. Car soap represents another example of a vehicle constant.

In another embodiment, an insurance provider can maintain and provide access to a system for standardizing account of consumables to both wholesalers and/or body shops. In such an embodiment, the insurance provider maintains material list templates for particular repairs. The insurance provider can provide access to the system for standardizing accounting of consumables to its preferred repairers and/or preferred list of wholesalers. In such an embodiment benefits accrue both to the insurer, as control is maintained by the party ultimately responsible for paying for the repair, and to the body shop, who knows that the invoices generated for a repair will meet the requirements for that insurer. In another embodiment, the insurance provider may specifically provide for deviation from the template according to criteria acceptable to the insurance provider.

According to one aspect of the present invention, a method for standardizing accounting of consumables is provided. The method comprises acts of providing at least one consumable material template for a project, providing an interface adapted to generate an invoice associated with the project, providing for a user to input information associated with the project, selecting the at least one consumable material template in response to user input, and restricting access to the at least one consumable material template. According to one embodiment of the present invention, the method further comprises an act of generating the at least one consumable material template from direct measurements. According to another embodiment of the invention, the method further comprises an act of deriving at least one additional consumable material template from the recorded measurements. According to another embodiment of the invention, the method further comprises acts of comparing characteristics of project targets, deriving a modification factor, and generating at least one additional consumable material template using the modification factor. According to one embodiment of the invention, restricting access to the at least one consumable material template further comprises limiting variation of the at least one consumable material template by a predefined threshold.

According to one embodiment of the present invention, restricting access to the at least one consumable material template further comprises preventing alteration of the at least one consumable material template. According to another embodiment of the invention, the method further comprises an act of limiting consumable material selection by a user to at least one predetermined brand. According to another embodiment of the invention, the method further comprises an act of providing a plurality of automobile objects. According to another embodiment of the invention, the method further comprises an act of generating consumable material templates using the plurality of automobile objects. According to another embodiment of the invention, the project comprises work associated with an automobile. According to another embodiment of the invention, the method further comprises providing for submission of variations to the consumable material templates, and determining the requested variations meet a predetermined threshold.

According to one embodiment of the present invention, the method further comprises an act of generating an invoice for the project based on the selected at least one consumable material template. According to another embodiment of the invention, the act of generating an invoice for the project based on the selected at least one consumable material template occurs in response to the act of determining the requested variations meets a predetermined threshold. According to another embodiment of the invention, the act of limiting consumable material selection by a user to at least one predetermined brand, further includes an act of providing a subset of available brands.

According to one aspect of the present invention, a computer-readable medium having computer-readable signals stored thereon that define instructions that, as a result of being executed by a computer, instruct the computer to perform a method for standardizing accounting of consumables is provided. The method comprises acts of providing at least one consumable material template for a project, providing an interface adapted to generate an invoice associated with the project, providing for a user to input information associated with the project, selecting the at least one consumable material template in response to user input, and restricting access to the at least one consumable material template. According to one embodiment of the present invention, the method further comprises an act of generating the at least one consumable material template from direct measurements. According to another embodiment of the invention the method comprises an act of deriving at least one additional consumable material template from the recorded measurements. According to another embodiment of the invention, the method further comprises the acts of comparing characteristics of project targets, deriving a modification factor, and generating at least one additional consumable material template using the modification factor.

According to one embodiment of the present invention, restricting access to the at least one consumable material template further comprises limiting variation of the at least one consumable material template by a predefined threshold. According to another embodiment of the invention, restricting access to the at least one consumable material template further comprises preventing alteration of the at least one consumable material template. According to another embodiment of the invention, the method further comprises an act of limiting consumable material selection by a user to at least one predetermined brand. According to another embodiment of the invention, the method further comprises an act of providing a plurality of automobile objects. According to another embodiment of the invention, the method further comprises an act of generating consumable material templates using the plurality of automobile objects. According to another embodiment of the invention, the project comprises work associated with an automobile. According to another embodiment of the invention, the method further comprises providing for submission of variations to the consumable material templates, and determining the requested variations meet a predetermined threshold.

According to another embodiment, the method further comprises an act of generating an invoice for the project based on the selected at least one consumable material template. According to another embodiment, the act of generating an invoice for the project based on the selected at least one consumable material template occurs in response to the act of determining the requested variations meets a predetermined threshold. According to another embodiment, the act of limiting consumable material selection by a user to at least one predetermined brand, further includes an act of providing a subset of available brands.

According to one aspect of the present invention, a system for standardizing accounting of consumables is provided. The system comprises a user interface for accepting user input associated with a project, a storage component for storage and retrieval of at least one consumable material template associated with a project, an analysis engine for selecting the at least one consumable material template in response to user input, and an administration component for defining user roles, wherein the administration component is adapted to restrict access to the at least one consumable material template. According to one embodiment of the present invention, the storage component stores at least one consumable material template generated from direct measurements. According to another embodiment of the invention, the analysis engine is further adapted to derive at least one additional consumable material template from recorded measurements. According to another embodiment of the invention, the analysis engine is further adapted to compare characteristics of project targets, derive a modification factor; and generate at least one additional consumable material template using the modification factor. According to another embodiment of the invention, the administration component is adapted to limit variation of the at least one consumable material template by a predefined threshold.

According to one embodiment of the present invention, the administration component is further adapted to prevent alteration of the at least one consumable material template. According to another embodiment of the present invention, the system a brand selection component for limiting consumable material selection by a user to at least one predetermined brand. According to another embodiment of the invention, the system further comprises an automobile object. According to another embodiment of the invention, the analysis engine is further adapted to generating at least one additional consumable material template using the automobile object. According to another embodiment of the invention, the project comprises work associated with an automobile. According to another embodiment of the invention, the user interface is further adapted to accept submission of variations to the at least one consumable material template; and the analysis engine determines whether the requested variations meet a predetermined threshold.

According to one aspect of the present invention, a method for incenting materials purchases used for automotive repair into preselected brands is provided. The method comprises acts of providing at least one consumable material template for a repair, providing for a user to input information associated with the repair, providing for a user to generate an invoice associated with the repair, and restricting user selection to at least one predefined brand of material for the repair.

According to one aspect of the present invention, a system for incenting materials purchases used for automotive repair into preselected brands is provided. The system comprises a user interface for accepting user input associated with a repair, a storage component for storage and retrieval of at least one consumable material template associated with a repair, an analysis engine for selecting the at least one consumable material template in response to user input, and an administration component for restricting user selection to at least one predefined brand of material.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

FIG. 5A illustrates an embodiment of an interface for a system for standardizing accounting of consumables according to aspects of the present invention;

FIG. 5B illustrates an embodiment of an interface for a system for standardizing accounting of consumables according to aspects of the present invention;

FIG. 5D illustrates an embodiment of an interface for a system for standardizing accounting of consumables according to aspects of the present invention;

FIG. 5F illustrates an embodiment of an interface for a system for standardizing accounting of consumables according to aspects of the present invention;

The figures are presented by means of illustration and are not meant to be limiting.

DETAILED DESCRIPTION

The invention is illustrated by way of example and not by way of limitation in the figures of the accompanying drawings in which like references indicate similar elements. References to embodiments in this disclosure are not necessarily to the same embodiment, and such references mean at least one. While specific implementations may be discussed, it is understood that this is done for illustrative purposes only. A person skilled in the relevant art will recognize that other components and configurations may be used without departing from the scope and spirit of the invention.

Figure 1:
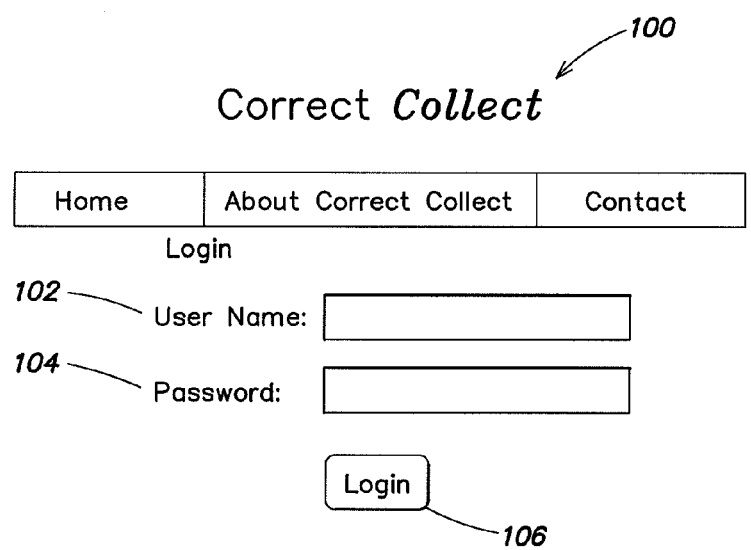
FIG. 1 illustrates an embodiment of an interface for a system for standardizing accounting of consumables according to aspects of the present invention.

With respect to FIG. 1 shown is an embodiment of an interface for accessing a system for standardizing accounting of consumables. Interface 100, provides for authorization of users, by requiring a user name at 102 and a password at 104. Once entered access is granted by clicking on the login button 106. User names and passwords may be generated based on the functions that are permitted for a particular user. For example, where a Jobber/Wholesaler is hosting and/or controlling the system, the user name and password for the Jobber will be associated with a particular set of functions. In one embodiment, administrative functions are accessible only by the Jobber. In such an embodiment, the Jobber distributes work to various body shops pursuant to some arrangement between the two. The Jobber may provide access to the a system for standardizing accounting of consumables to various body shop as part of their business relationships, as an incentive to establish a business relationship, or as an incentive to purchase materials supplied by the Jobber, among other reasons. In one embodiment, the Jobber purchases licenses for use by body shops, and consequently has the use of functions and functionality that permit maintenance of those licenses. In another embodiment, the functions and functionality provided to the Jobber include the ability to purchase additional licenses.

According to one embodiment, the Jobber operates as the administrator of the system and controls the consumable material templates. In one embodiment, the consumable material templates are generated from specific measurements made during particular repairs, and are provided with the system. Periodic updates may also be provided to an administrator, to insure the accurate data is being used. Such periods may be yearly, monthly, among other intervals. In another embodiment, the system itself is periodically updated with new consumable material data, and the administrator and end users are provided with the updated information automatically.

In one example, measurements of consumable materials used in a fender repair are track over a number of such repairs. The tracked data yields specific numbers related to the use of tape, sandpaper, scuff pads, finishing pads, among other consumable materials. In one example, the templates are the result of the average usage of each consumable item across the measurements, and in another, included is the ability to vary quantities of any of the consumable items in the consumable material templates up to the measured standard deviation. Other thresholds may also be applied to the variability, and in one example is a predetermined percentage.

By providing an administrator control over the consumable material templates, the Administrator is provided with the option of allowing access by end users to only certain templates, as well as the option to limit the materials available in the materials list for the users of the system. In one embodiment, the Jobber provides user names and passwords to a number of Body Shops, each of the user name and passwords combinations is unique to each Body Shop. Each user name password combination is associated with a specific user role that limits that particular user's access as desired by the Jobber. In one example, the Jobber has a relationship with the Body Shop for providing all of the 3M brand supplies used at that particular shop. The Jobber through the administrative features of the system for standardized accounting may define a user role that provides the Body Shop access to consumable material templates for 3M products. In such an embodiment, the Body Shop is provided with a system that assists in the tracking and improved reimbursement for work and materials, and the Jobber/Wholesaler provides an incentive for the Body Shop to purchase products it provides. The Jobber may provide access to selectable brand names for materials the Jobber provides or the Jobber may restrict the consumable material templates to specific brands based on higher return, etc. The nature of the selection of brand is at the discretion of the Administrator of the system for standardizing accounting of consumable materials, which in one embodiment would comprise the Jobber.

Figure 2:
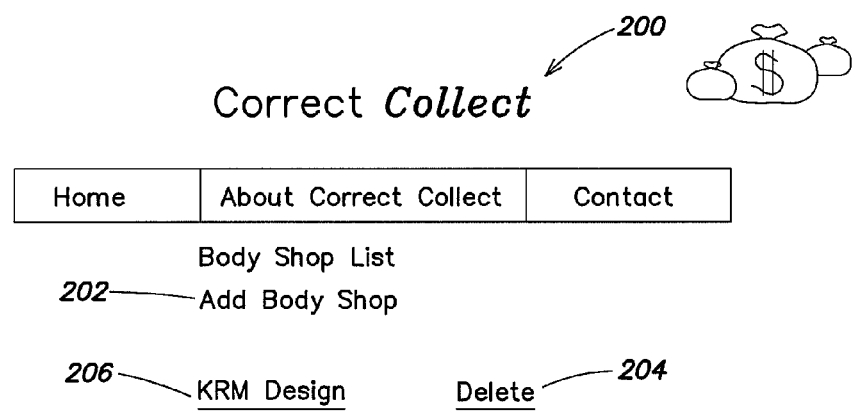
FIG. 2 illustrates an embodiment of an interface for a system for standardizing accounting of consumables according to aspects of the present invention.

With respect to FIG. 2, shown is an embodiment of an interface for the system for standardized accounting of consumables. Interface 200, illustrates an administrative access screen for adding body shops according to aspects of the present invention. Through interface 200, an administrator of the system for standardizing accounting of consumables maintains 206, adds 202, deletes 204 end users of the system. In one embodiment, the end users are body shops. The body shops are provided with user names and passwords to access the system in order to generate invoices for reimbursement. The administrator of the system may be a Jobber who purchases site licenses for users, in order to provide body shops with access to the system for standardized accounting, or the administrator may be any other provider where the use of consumables factors into a reimbursement requests relationship for compensation. For example, in the medical field a hospital may provide access to a system for standardized accounting of consumables used in medical procedures. The hospital maintains the system for the doctors use as an incentive to use the hospital's services, or to increase recoverable rates on reimbursements from insurance providers.

Figure 3:
FIG. 3 illustrates an embodiment of an interface for a system for standardizing accounting of consumables according to aspects of the present invention.

With respect to FIG. 3, shown is an embodiment of an interface for a system for standardizing accounting of consumables. Interface 300 illustrates an end user maintenance screen. In particular, interface 300 shows an example where the end user is a body shop and displays the information associated with that body shop, name 302, account number 304, at 306 the interface displays user name, password, password reminder, security question, security answer, enable i.e. status for system use (306), at 308 the system displays contact information—contact's first name, last name, phone number 1, phone number 2 (if any), and fax number. At 310 the system display address information—address name, address line 1, address line 2, address line 3, city, state, country, and zip code. The interface 300 may also provide selectable drop down lists to assist in the entry of relevant information, at 318, state information is selectable through drop down menu 318. The status of the body shop can be toggled between enable, where a check will appear in box 316, and not enable where no check appears in box 316. Once the information associated with a particular end user has been entered, the administrator creates the new user by selecting 312. Additionally, the process may be cancelled by selecting 314.

Figure 4:
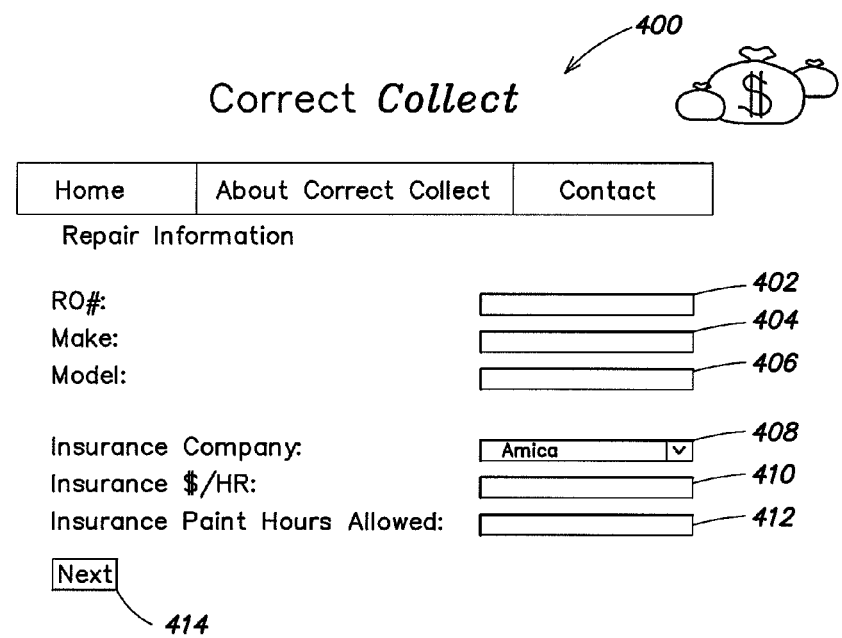
FIG. 4 illustrates an embodiment of an interface for a system for standardizing accounting of consumables according to aspects of the present invention.

FIG. 4 shows an embodiment of an interface for a system for standardizing accounting of consumables. Interface 400 illustrates a data entry screen for a project, where the end user enters information associated with the project. In particular interface 400 shows an example where the end user is a body shop, and is provided with fields associated with a vehicle repair. At 402, the end user inputs a RO# (repair order number) if one exists for the particular repair. According to one embodiment, the system is being provided by a Jobber to body shop, the RO# field represents the number assigned by the Jobber to a particular work order and the body shop who has received the work inputs the associated number. In one example no RO# has been assigned and interface 400 is designed to process the input information without an entry in 402. The end user inputs the make at 404 and model at 406 of the vehicle to be repaired. Interface 400 provides the end user a selectable drop down menu 408 for selecting the appropriate Insurance Company. In one example the insurance company may be Amica, Geico, Progressive, among others. In an alternative embodiment, the user may manually type the name of the Insurance Company rather than select from a list. At 410 the end user inputs the Insurance $/hr. Insurance $/hr represents the rate at which the selected insurance company reimburses a body shop for worked performed. In one embodiment, field 410 is not input by the end user but rather field 410 is displayed automatically based on the selection of an Insurance Company at 408. At 412, the end user inputs the Insurance Paint Hours Allowed. Insurance Paint Hours Allowed is controlled by the amount of time an insurance company will reimburse a body shop for a repair. This value is established based on what the insurance company believes the reasonable repair should take in terms of time. In one embodiment (not shown), the Insurance Paint Hours Allowed is automatically generated by the system based on information input by the user—Insurance Company, make, model, type of paint, color, and part. At 414, the end user proceeds to another screen for inputting information associated with a project by clicking on the Next button.

Under conventional mark up reimbursement, a mark up on the paint hours is applied to cover the cost of consumables used in the repair. Where a mark up is only allowed on paint hours, the mark up may fail to cover work done outside the allowed paint hour time. For example, work done to prepare a surface may or may not be covered by the paint hours allowed. Any materials used in uncovered time are not going to be reimbursed by conventional models. In one embodiment, the information associated with allowed paint hours and the associated mark up allowed is presented in conjunction with an invoice generated by the system, detailing the difference between coverage costs by mark up and actual costs.

With respect to FIG. 5A-F, shown is embodiments of an interface for a system for standardizing account of consumables. Interface 500 illustrates a data entry screen for a project, where the end user enters information associated with the project. In particular interface 500 shows an example where the end user is a body shop, and the end user is entering specific information associated with a particular repair. At 502, the user inputs information associated with the vehicle being repaired by selecting a radio button for Car or Truck. In other embodiments, additional radio buttons (or selectable options) are provided, for example, SUV, Minivan and alternatives include additional detail such as luxury vehicle, or edition information related to a particular make an model (e.g. sport edition, luxury edition, among others). In response to a user selecting a vehicle type at 502, additional options are presented to the user, shown in one embodiment as interface 520 at 504 and 506, FIG. 5B. The user selects the Car Size at 504, and inputs the door style at 506 for the vehicle being repaired. At 508, the user selects the paint type.

In alternative embodiments, different user selections are presented in response to the end user identifying the type of vehicles as a truck. For example, a user may select truck as a vehicle type in order to enter information regarding an SUV. In one embodiment selection of truck triggers a request for additional information—SUV, Pickup, or Van selections are presented to the user, as well as size (large or small), style, cab type, bed length, among others.

Figure 5C:
FIG. 5C illustrates an embodiment of an interface for a system for standardizing accounting of consumables according to aspects of the present invention.

Different paint types may require different paint times, and may be reimbursed at different rates by different insurers. At 510, the user selects the color of paint for the vehicle. Shown at 530, FIG. 5C, is one embodiment of the color selection drop down menu. A user inputs the information associated with a particular project, and continues by selecting 512, Next.

Interface 540, FIG. 5D, shown is an embodiment of an interface for a system for standardizing accounting of consumables. Interface 540 illustrates a data entry screen for a project, where the end user enters information associated with the project. In particular interface 540 shows an example where the end user is a body shop, and the end user is entering specific information associated with a particular repair. Interface 540, includes a repair part list 542 associated with the vehicle information entered by the user. Repair part list 542 provides the user the opportunity to select particular part for repair. One should appreciate that repair part list 542 is not exhaustive, and additional parts may be detailed for a particular make and model of vehicle, as well as different or additional parts for different vehicles.

A user selects checkbox 544 to indicate that the part to be repaired is a right fender. In response to the user selecting 544, additional options are displayed to the user at 546. At 546 the user is presented with radio button to select whether the repair involves replacement of parts, repair of parts, or painting in the form of blending. In response to the user selecting repair at 546, additional options are presented at 548. At 548, the user is presented with radio buttons for identifying whether the repair will require full paint (full paint meaning a repainting of the entire vehicle is required) or a blend (matching the original color of the vehicle with the repaired area by blending the color (new and old) together in a transition area). A user continues through the system by selecting Next at 570, either on the top of the screen or the bottom. One should appreciate that interface 540 shows an example where only one part is selected, however many parts, and even every part listed could be selected for repair.

Figure 5E:
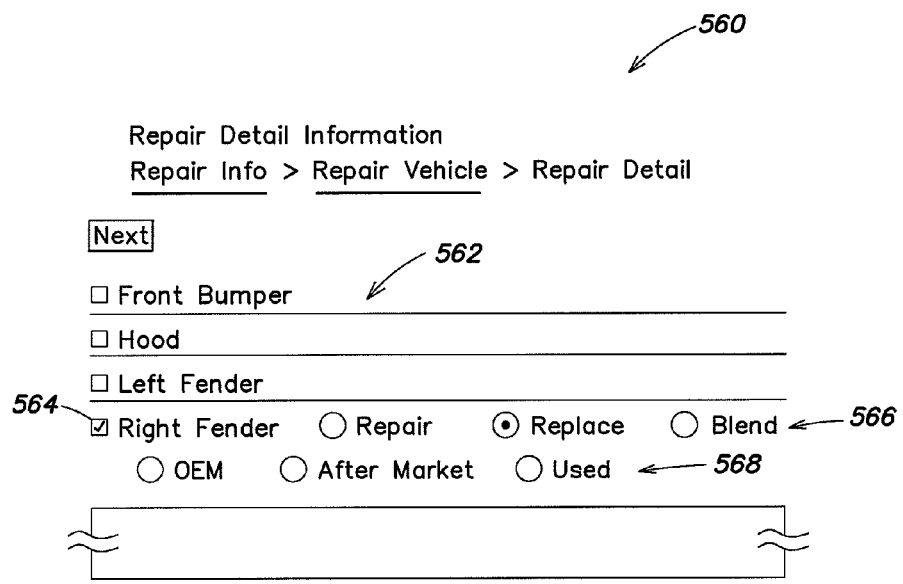
FIG. 5E illustrates an embodiment of an interface for a system for standardizing accounting of consumables according to aspects of the present invention.

In one embodiment, where the user selects replace at 566 different options are provided to the user, for example in interface 560, FIG. 5E. The user is presented with a repair parts list at 562. Shown is a partial list of available parts. At 564, the user selects the right fender as the part to repair by clicking on checkbox 564. In response to selecting replace at 566, additional selections are presented to the user at 568. At 568 the user selects the type of part used for the repair. OEM (original equipment manufacture) parts are parts obtained from the manufacturer, after market parts are those produced not by the manufacturer but designed to fit the particular vehicle, and used parts are what their name implies, and typically come from junked or failed vehicles of the same type.

FIG. 5F shows an embodiment of an interface for a system for standardizing account of consumables. Interface 580 illustrates a data entry screen for a project, where the end user enters and reviews information associated with the project. In particular interface 580 shows an example where the end user is a body shop, and the end user is entering and reviewing specific information associated with a particular repair. Interface 580 contains a materials list 582 detailing all the materials used in the particular repair for the selected part(s). Material list 582 contains an option at each entry for removing items that were not used in the particular repair. In alternative embodiments (not shown), the remove feature is disable or not shown as the end user is not permitted to alter the materials list. Optionally the selection of remove refers a message indicating "not authorized." At 584, an end user is provided an option to add additional item to a repair, where materials were used and are not reflected in the material list 582. Again in other embodiments, this feature may be disabled or not shown, where the user is not permitted to alter the material list generated by the system. According to one embodiment, the ability to vary the material list shown is constrained by predetermined thresholds, and both the removal option contained in material list 582 and the add additional items to a repair option 584 must not result in an invoice that exceeds the threshold. Optimally selecting add may return a message indicating "not authorized." In one embodiment, the threshold is a percentage of the total value of the generated invoice, and in another is a threshold determined by the standard deviation of measurements made during the generation of consumable material templates. In one alternative, each consumable item on the list may have its own threshold, and in another the individual thresholds may be combined with an overall threshold that also can not be exceeded. Once the user is satisfied that the material list reflects the consumable materials used in the particular repair the user selects 588 view/print invoice to generate the invoice that will be submitted for reimbursement. In reviewing the materials list 582, the user may change the view of the items used so that it groups items by each part repaired, by selecting 586, repair items by vehicle part.

Interface 580 also provides summary information on the total costs associated with the materials list 582, at 590. Totals at 590 includes sales tax information, as well as a determination of what the insurance amount allowed is based on paint time and dollars per hour allowed by the insurer. Any remaining amounts to be collected are also shown at 590.

Figure 6:
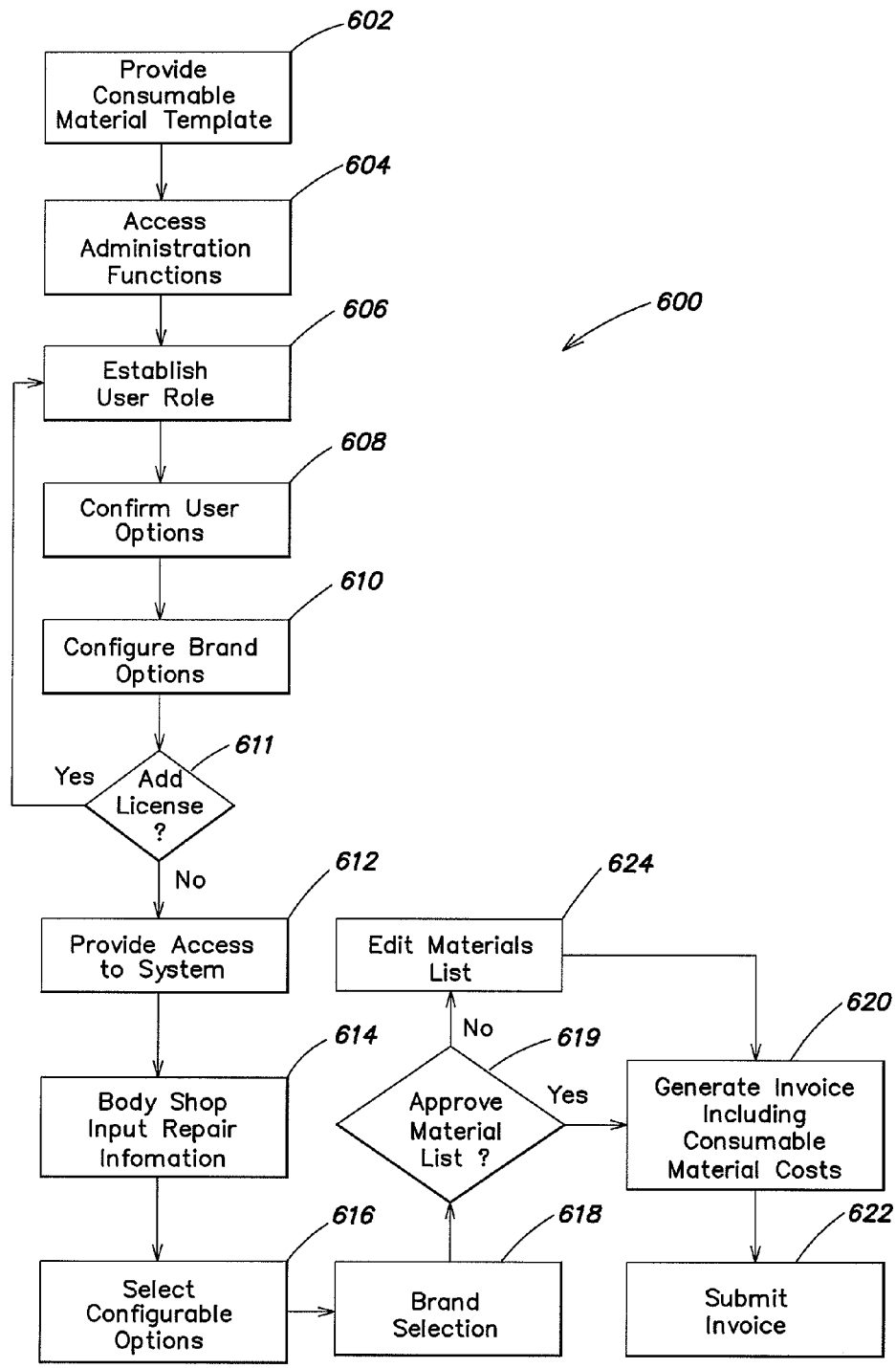
FIG. 6 is a flow diagram illustrating one embodiment of a procedure for standardizing accounting of consumables according to aspects of the present invention.

With respect to FIG. 6, shown is a process 600 for standardizing the accounting of consumable materials according to one embodiment of the present invention. Process 600 begins at step 602 where consumable material templates are provided to a provider of a system for standardizing the accounting of consumable materials. The provider may be the systems administrator, the host of a web based interface for accessing the system, a Jobber who distributes work to various Body Shops, as well as other entities who use the system for standardizing accounting of consumable materials. The provider may be an insurer providing access to a list of its preferred Body Shops, for example.

At step 604, the provider accesses administrative functions. In one embodiment, the administrative functions accessed include establishing user roles, at step 606, for the users who will ultimately generate invoices for reimbursement. According to another embodiment, the provider is a Jobber, who establishes a user role at 606, for a Body Shop with whom the Jobber has a business relationship—typically by defining a user name and password combination. User names may be generated in a number of fashions, the system may provide randomly generated user names and randomly generated password combinations, or in one example the system permits the input of a user name and password. In one alternative, the user name is automatically generated, and in another the password is as well. Passwords may be automatically generated as a default or may be randomly created.

One should understand that a pre-existing business relationship is not necessary between the provider/administrator of the system and the end user. In one embodiment, the Jobber, as the administrator, establishes the functions permitted for the particular role by configuring the user's options at 608. In one embodiment, configuring user's options includes defining the templates a user has access to, at 608, and in another embodiment further includes defining selectable brands for each consumable item, at 610. In one alternative, the administrator may establish one specific brand for a particular item on a consumable material template, at 610. In one example, at 610, the Administrator establishes a particular brand for every item used in a particular repair, and is not limited to consumable materials. In other examples, the consumable material templates are presented in conjunction with all the other material required for the repair.

As part of the administrative functions an administrator is provided an option to purchase additional licenses to add additional users to the system. At 611 (Yes) a new user is required and the administrative selects an option to purchase an additional license. Once the additional license is purchased, the administrator establishes the user role for the new user at 606, and defines the user options at 608 and may configure specific brand options at 610. At 611(No) NO additional licenses are required, and the administrator provides access to the system at 612. In one embodiment access is provided through a web based interface, and the administrator provides the user names and passwords to the end users.

At step 614, the end user accesses the system, and inputs the make and model of the vehicle, as well the part to be replaced and/or repair. At step 616, the user selects any options that have been provided by the administrator. For example, inputting the make and model of the vehicle prompts a list of parts to be repaired to display. In one embodiment, the user may select the type of part being replaced OEM, or user, in another embodiment the user may additionally specify that a repair rather than a replacement is taking place. Other selectable options include color of the vehicle being repaired, type of paint (for example two stage or three stage paint), paint color, among others. Once the end user has identified the part to be repaired and/or replaced, the user may be presented with the option of identifying the brand of the consumables used in that repair. At 618, the user select particular brands for consumables—in one example the user selects 3M brand for the consumables. In the alternative, at 618, the user is not provided with selectable options, but rather based on administrative settings for the particular user, a brand identifier appears with a list of consumables used in that repair. In another embodiment, the user is presented with a list of all the materials needed to complete a particular repair, and is provided with drop down selections for brands of each, at 618. In one example, the user is presented with a list of the materials needed and an indication that a specific brand has been selected for each at 618.

According to one embodiment, at optional step 619, the user is provided the opportunity to increase or decrease the quantities of materials presented. According to one aspect, the ability of the end user to vary the quantities listed is constrained by a threshold. In one example the user approves the materials list and the quantities used at 619(YES), or the user does not approve the quantities used at 619(NO) and enters modifications to the quantities provided at 624. According to one embodiment, the modifications to the listed quantities are required to meet a predetermined threshold, and modifications that do not do so will be rejected. In another embodiment, the system provides an indication that the attempted modification does not meet the threshold and resets to the default value.

According to one embodiment, step 619 is optional based on the settings that the administrator has established for a particular user. Where step 619 is not provided, as well as where the material list and quantities is approved, 619(YES), an invoice is generated at 620 including the consumable material and the quantities used in the repair. At 622, the invoice is submitted for reimbursement. Submission may occur electronically, or may require the user to print and mail the invoice for re-imbursement.

It should be understood that process 600 is discussed with respect to the standardizing of accounting of consumables used in automotive repair, but the principles disclosed can be used in situations where consumable/disposable items are used for other projects. For example, surgical procedures use a number of single use/consumables during the course of an ordinary surgery.

Figure 7:
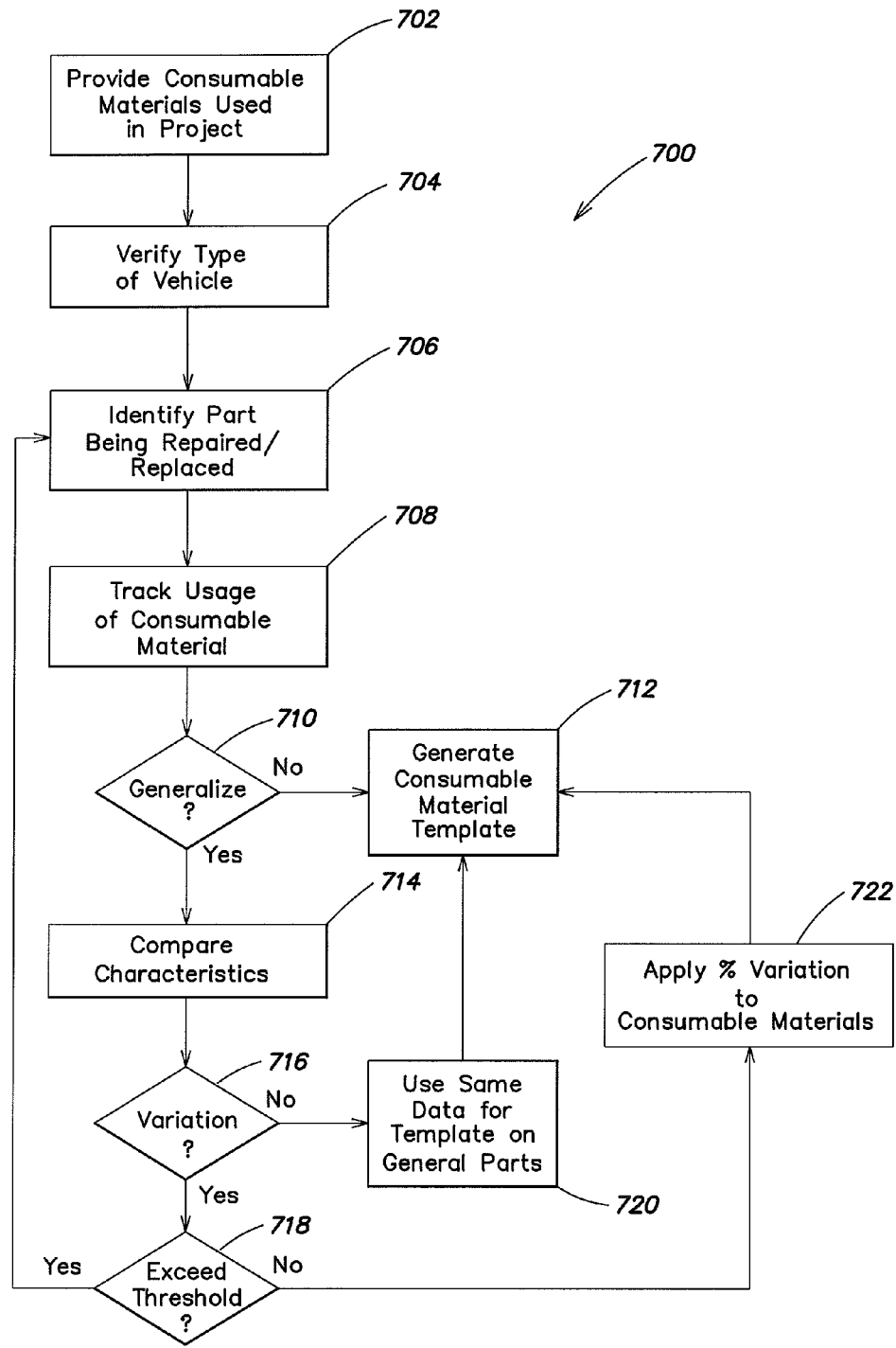
FIG. 7 is a flow diagram illustrating one embodiment of a procedure for standardizing accounting of consumables according to aspects of the present invention.

With respect to FIG. 7, shown is a process 700 that enables a system operator to provide consumable material templates for use in various embodiments of the system for standardizing accounting of consumables. Process 700 generates accurate data regarding the use of consumable materials during particular projects. The type of project is not necessarily important, and the system for standardizing accounting of consumables can be applied to a number of projects that require the use of consumable material, for example, health services and medical procedures, as well automotive repair, among others.

Process 700 is described with respect to an automotive repair project and the consumable materials associated, however, one should appreciate that not all the steps disclosed need be performed with respect to different fields and that additional steps may also used in association with other fields. Process 700 beings with providing consumable materials, at 702, used in typical automotive repair. According to one aspect, having everything at hand that may be used is advantageous, but not necessary. For instance, the materials for the specific repair being tracked are all that is needed, but having others may decrease over all tracking time. One should appreciate that providing the materials in 702 should also encompass getting or buying the consumable materials. At 704, the make and model of the automobile sought to be repaired is identified. Optionally, 704 may include identifying the year of the automobile. At 706, the part(s) being repaired and/or replaced is identified. At 708, the consumables used during the course of the repair/replacement are tracked. It is important to note that as part of the tracking step, portions of consumables items are recorded. If for example a scuff pad used in the repair is not consumed over the course of one repair, but is consumed over the course of several, the fraction of the pad used per repair is tracked as well. Alternatively, fractional use may be tracked when the item is consumed and averaged over the number of repairs is was used. At step 710, a decision is made on whether to generalize the data being tracked. The decision determines whether for every single part data needs to be tracked or if the opportunity to generalize is available. In one example, a part for a particular make and model of car may have no differences (size, shape, surface area, etc.) with respect to a similar part of a different make, in such a situation, the consumable material used in a repair and/or replacement of such a part are assumed the same. Alternatively, even in the cases where similar parts have almost or identical physical characteristics it is beneficial to track actual use of consumable material items independently at 710(NO). Following a decision not to generalize, 710(NO), at 712, a consumable materials template is generated for that make, model, and part. One should appreciate that step 712 may involve the tracking of a number of repairs of a part, and developing the numbers and list of consumable materials used for a reasonable repair. Reasonable repair may involve some deviation in the number and amount of consumable materials used. Typically, such deviation is minimized over a larger number of samples (i.e. tracked repairs), but a window for deviation may also be built into such a consumable material template. In one example, the window for deviation is associated with a percentage of what is established as the type and amounts of consumable materials used in a reasonable repair.

Where generalization is permitted 710(YES), the specification and/or physical characteristics for the part being repaired are compared, at 714, for different makes, in one embodiment, different models in another, and for different year of vehicle in yet another. According to one embodiment, all of the preceding elements—make, model and year are compared for particular parts. If there are no differences between parts 716(NO) for varying makes, models, and/or year then the same data tracked at 708 is used at 720 to generate consumable material templates for the identical parts. One should appreciate that 716(NO) may also be reached where there is minor, or slight variation between specific parts for different makes, models, or years of vehicles. For example, in repairs requiring a volume of paint determined by surface area, repairs on part with the same surface area or similar surface areas, in one embodiment that same data may be used to generate a consumable material template for both parts.

According to one aspect, data sampled for a particular part, make, and model of vehicle can be extended to other parts, makes, and models. For example, the amount of paint used, and the consumable materials used to repair a compact car's front right fender can be recorded and associated with the physical characteristics of that part. In one embodiment, extending the recorded data to the right fender of another type of vehicle and intermediate sized car's front right fender involved a comparison of the physical differences between the compact part and the intermediate part. For example, the variation between the parts involves a percentage of surface area to be painted. By factoring the sampled data for the compact part with the percent difference, an accurate representation of the consumable materials used is obtained for the intermediate part. Such generalizations reduce the overhead involved in sampling materials used for every part of every vehicle, and still provide a provable basis for invoicing.

In one embodiment, where there is any variation 716(YES) a determination is made as to whether the variation is over a particular threshold, 718. The threshold may be automatically determined by percent variation in physical characteristics, in one alternative embodiment the determined threshold may be approved or rejected by an operator of the system. Some embodiments permit the user to approve or reject automatic determinations regarding the appropriateness of tracked data for additional parts. In other embodiments, such determinations are entirely automatic based on percent variation in physical characteristics. Although other criteria may be used to establish thresholds. Alternatively, multiple thresholds may be established. An individual threshold may be based on specific consumable materials. In one example, the threshold with respect to tape used may rely solely on length of the outer edge of a particular part, whereas for paint used, the threshold is based on surface area. Where the variation in characteristics is not above the threshold 718(NO) the percent variation in the relevant characteristic is applied to data generated from step 708, at 722, and the modified numbers are used to generate a consumable material template at 712 for the compared part.

Where the variation exceeds the established threshold 718 (YES), a consumable material template for the tracked part is generated at step 712 and a determination is made that the tracked data is not valid for the compared part. Optionally, step 706 is repeated for that compared part and process 700 continues as discussed above and concludes at 712 with the generation of a consumable material template for the compared part (not shown). A consumable material template can be incorporated into other parts lists, so that the entire materials list for a particular repair will be displayed, and the invention is not limited to consumable material templates alone.

Various embodiments according to the present invention may be implemented on one or more computer systems. These computer systems may be, for example, general-purpose computers such as those based on Intel PENTIUM-type processor, Motorola PowerPC, AMD Athlon or Turion, Sun UltraSPARC, Hewlett-Packard PA-RISC processors, or any other type of processor. It should be appreciated that one or more of any type computer system may be used to facilitate systems and methods of standardizing accounting of consumables as well as systems and methods for directing consumable materials purchases used in automotive repair into selected brands. Such systems may be located on a single computer or may be distributed among a plurality of computers attached by a communications network.

A general-purpose computer system according to one embodiment of the invention is configured to perform any of the described functions, including but not limited to the providing and interface for the generation of invoices, providing consumable material templates, storing data records associated with vehicles and their respective parts, storing and analyzing data used in the generation of consumable material templates, providing administrative functions for the interface, establishing user roles, rights, and permissions, as well as the other functions described above. Additionally, such functions may include rendering an interface to provide user access, administration tools for a system for standardizing accounting of consumables, to receive data associated with projects, to report on the data associated with projects, to organize and analyze materials lists, provide selectable options for inputting data, provide restrictions on selectable options, establish thresholds related to user variations of provided data, generate reports on differences between allowed costs and actual costs, among others. It should be appreciated, however, that the system may perform other functions, including providing an incentive for purchases of specific brands of materials used in projects, and more specifically may provide incentives for directing purchases of materials used in automotive repair into specific brands provided by a particular wholesaler, providing an integrated platform for coordination of the various component of a system for standardizing accounting of consumables, as well as an integrated platform for directing consumable materials purchases used for automotive repair into selected brands. Additional functions may also include establishing thresholds associated with a project, determining the associated threshold is not exceeded by user input, providing an indication of compliance with the threshold, establishing user access to the system, restricting user access to desired functions, and restricting user access to subsets of data.

Figure 8:
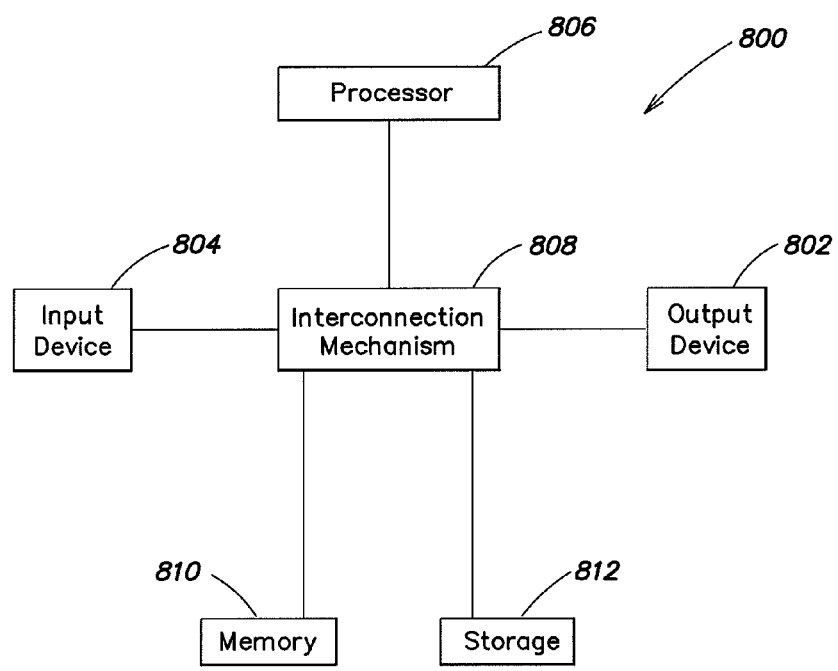
FIG. 8 is a block diagram of a system for managing standardizing accounting of consumables according to one embodiment of the present invention.

FIG. 8 shows a block diagram of a general purpose computer system 800 in which various aspects of the present invention may be practiced. For example, various aspects of the invention may be implemented as specialized software executing in one or more computer systems including general-purpose computer systems 1004, 1006, and 1008 communicating over network 1002 shown in FIG. 10. Computer system 800 may include a processor 806 connected to one or more memory devices 810, such as a disk drive, memory, or other device for storing data. Memory 810 is typically used for storing programs and data during operation of the computer system 800. Components of computer system 800 may be coupled by an interconnection mechanism 808, which may include one or more busses (e.g., between components that are integrated within a same machine) and/or a network (e.g., between components that reside on separate discrete machines). The interconnection mechanism enables communications (e.g., data, instructions) to be exchanged between system components of system 800.

Computer system 800 may also include one or more input (804)/output (I/O) devices (802), for example, a keyboard, mouse, trackball, microphone, touch screen, a printing device, display screen, speaker, etc. Storage 812, typically includes a computer readable and writeable nonvolatile recording medium in which signals are stored that define a program to be executed by the processor or information stored on or in the medium to be processed by the program.

Figure 9:
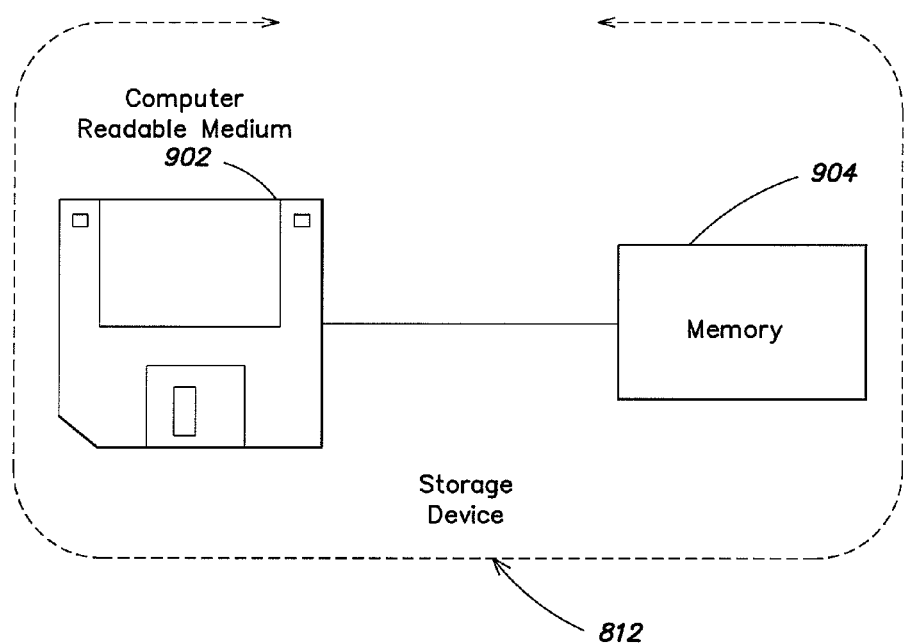
FIG. 9 is a block diagram of a system for managing standardizing accounting of consumables according to one embodiment of the present invention.

The medium may, for example, be a disk 902 or flash memory as shown in FIG. 9. Typically, in operation, the processor causes data to be read from the nonvolatile recording medium into another memory 904 that allows for faster access to the information by the processor than does the medium. This memory is typically a volatile, random access memory such as a dynamic random access memory (DRAM) or static memory (SRAM).

Referring again to FIG. 8, the memory may be located in storage 812 as shown, or in memory system 810. The processor 806 generally manipulates the data within the memory 810, and then copies the data to the medium associated with storage 812 after processing is completed. A variety of mechanisms are known for managing data movement between the medium and integrated circuit memory element and the invention is not limited thereto. The invention is not limited to a particular memory system or storage system.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 800 is shown by way of example as one type of computer system upon which various aspects of the invention may be practiced, it should be appreciated that aspects of the invention are not limited to being implemented on the computer system as shown in FIG. 8. Various aspects of the invention may be practiced on one or more computers having a different architectures or components than that shown in FIG. 8.

Computer system 800 may be a general-purpose computer system that is programmable using a high-level computer programming language. Computer system 800 may be also implemented using specially programmed, special purpose hardware. In computer system 800, processor 806 is typically a commercially available processor such as the well-known Pentium class processor available from the Intel Corporation. Many other processors are available. Such a processor usually executes an operating system which may be, for example, the Windows-based operating systems (e.g., Windows Vista, Windows NT, Windows 2000 (Windows ME), Windows XP operating systems) available from the Microsoft Corporation, MAC OS System X operating system available from Apple Computer, one or more of the Linux-based operating system distributions (e.g., the Enterprise Linux operating system available from Red Hat Inc.), the Solaris operating system available from Sun Microsystems, or UNIX operating systems available from various sources. Many other operating systems may be used, and the invention is not limited to any particular operating system.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems coupled to a communications network. These computer systems also may be general-purpose computer systems. For example, various aspects of the invention may be distributed among one or more computer systems (e.g., servers) configured to provide a service to one or more client computers, or to perform an overall task as part of a distributed system. For example, various aspects of the invention may be performed on a client-server or multi-tier system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol.

Various embodiments of the invention may be programmed using an object-oriented programming language, such as Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

Various aspects of this invention can be implemented by one or more systems similar to system 800. For instance, the system may be a distributed system (e.g., client server, multi-tier system) comprising multiple general-purpose computer systems. In one example, the system includes software processes executing on a system associated with a user (e.g., a client computer system). These systems may permit authorization of a user locally or may permit remote authorization of a user using login name and passwords. There may be other computer systems that perform functions such as receiving and analyzing data associated with projects, generating invoices from user input and stored material templates, rendering an interface for a system for standardizing accounting of consumables, rendering an interface for a system for directing consumable material purchases used in automotive repair into selected brands, implementing the functions discussed above, as well as other computer systems that may host the system for standardizing accounting of consumables, and may host the system for directing consumable materials purchases used for automotive repair into selected brands, etc. Additional functions may also include providing for generation of consumable material templates from measures made on completed project, importing data associated with projects, generating invoices associated with projects, etc. These systems may be distributed among a communication system such as the Internet. One such distributed network, as discussed below with respect to FIG. 10, may be used to implement various aspects of the invention.

Figure 10:
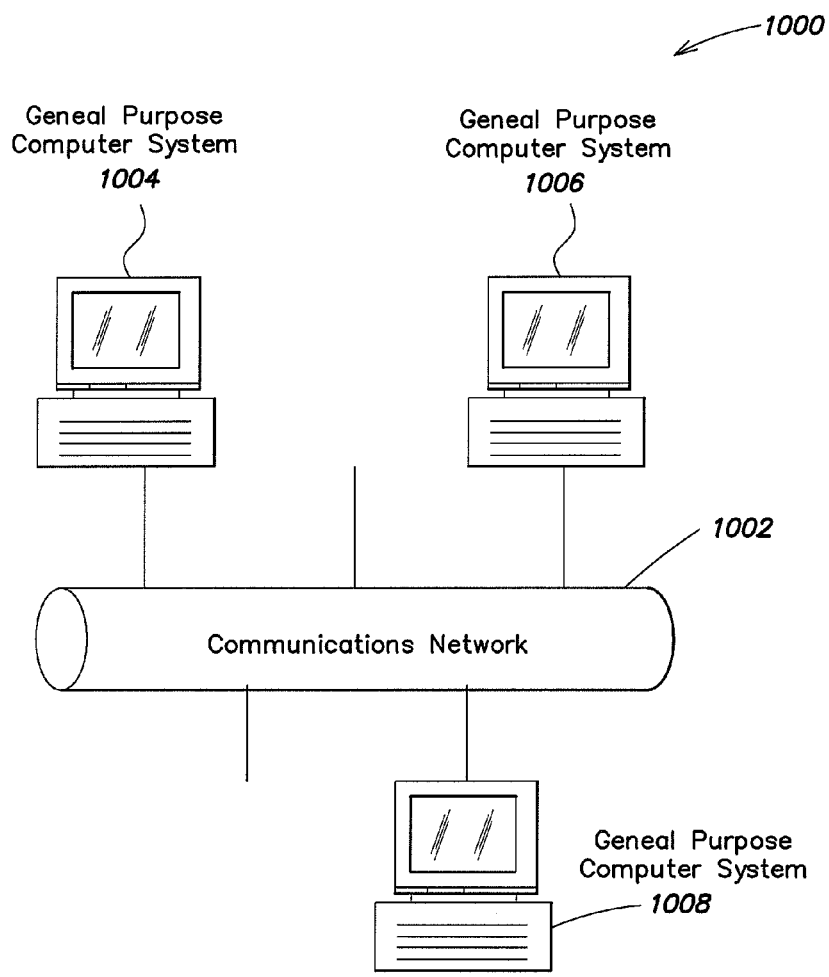
FIG. 10 is a block diagram of a system for managing standardizing accounting of consumables according to one embodiment of the present invention.

FIG. 10 shows an architecture diagram of an example distributed system 1000 suitable for implementing various aspects of the invention. It should be appreciated that FIG. 10 is used for illustration purposes only, and that other architectures may be used to facilitate one or more aspects of the invention.

System 1000 may include one or more general-purpose computer systems distributed among a network 1002 such as, for example, the Internet. Such systems may cooperate to perform functions related to user authentication. In an example of one such system for user authentication, one or more users is authenticated over one or more client computer systems 1004, 1006, and 1008 through which standardization of accounting of consumables occurs, and alternatively or in conjunction, directs purchases of consumable materials used in automotive repair into selected brands. It should be understood that the one or more client computer systems 1004, 1006, and 1008 may also be used to access, for example, a secure or unsecured site that includes standardized accounting and brand incentive functions for projects, etc., based on various aspects of the invention. In one example, an administrator and/or a user accesses such system(s) via an Internet-based interface.

In one example, a system 1004 includes a browser program such as the Microsoft Internet Explorer application program through which one or more websites may be accessed. Further, there may be one or more application programs that are executed on system 1004 that perform functions associated with user authentication. System 1004 may include one or more local databases including, but not limited to, data associated with projects, data associated with projects generated from actual measurements, data associated with specific vehicles, parts, vehicle model, vehicle make, vehicle year of manufacture, data associated with user roles, rights, and permissions, as well as information associated with insurers, data associated with and or defining thresholds, etc., information relating to generation of invoices, information relating to compensation allowed under conventional systems and methods.

Network 1002 may also include, as part of either or both the system for standardizing accounting of consumables and system for directing purchases of consumable materials used in automotive repair into selected brands, authenticating user(s) on one or more server systems, which may be implemented on general purpose computers that cooperate to perform various functions of either/or both the systems for managing standardizing accounting of consumables and the system for direct purchases of consumable materials used in automotive repair into select brands. Such function may include authorization of a user locally or may permit remote authorization of a user using login name and passwords, receiving and analyzing data associated with particular projects, generating invoices, establishing thresholds, rendering an interface, implementing the functions discussed above, as well as other function for hosting interface and data access feeds, etc. Additional functions may also include providing for generation of reports from data associated with projects, providing consumable material templates, estimating insurance allowable cost and generating the difference between actual and allowed costs, restricting access to consumable material templates, etc. System 1000 may optionally provide support for the system for standardizing accounting of consumables and/or the system for directing purchases of consumable materials used in automotive repair into selected brands. System 1000 may execute any number of software programs or processes and the invention is not limited to any particular type or number of processes. Such processes may perform the various workflows associated with the system for standardizing accounting of consumables and/or the system for directing purchases of consumable materials used in automotive repair into selected brands.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A computer implemented method for standardizing accounting of disposables, the method comprising the acts of:
   providing, by a computer system, at least one disposable material template for a project, wherein the act of providing at least one disposable material template for the project includes an act of providing at least one pre-defined quantity for a disposable item used in the project, wherein the disposable item is associated with an automobile part undergoing repair;
   providing an interface configured to generate an invoice associated with the project, wherein the user interface is further configured to accept user input associated with a repair project;
   receiving, by the computer system, input information associated with the project, including an automobile part to repair;
   selecting the at least one disposable material template in response to user input to identify at least one automobile part to be repaired, wherein the at least one disposable material template defines a plurality of disposable items and a quantity associated with each of the plurality of disposable items, wherein the plurality of disposable items are used to effect the repair of a vehicle with the at least one automobile part, and wherein the plurality of disposable items are disposed during the course of one or more repairs of the at least one automobile part for one or more vehicles;
   restricting access to the at least one disposable material template, wherein the act of restricting access to the at least one disposable material template includes an act of limiting, by the computer system, alteration of the quantities associated with the plurality of disposable items;
   calculating, automatically, cost of the repair, based, at least in part, on the selected disposable items to be used for the repair from the selected disposable material templates; and
   displaying a repair cost to the user and displaying the selected disposable items to be used for the repair.

2. The method of claim 1, further comprising an act of generating the at least one disposable material template from direct measurements of quantities of each of the plurality of disposable items used in the repair of the automobile part.

3. The method of claim 2, further comprising an act of deriving at least one additional disposable material template and quantities for the plurality of disposable items from recorded measurements.

4. The method of claim 2, further comprising acts of:
   comparing characteristics of project targets, wherein the act of comparing includes comparing at least physical characteristics of a first automobile part and physical characteristics of a second automobile part;
   deriving a modification factor for at least one known quantity for a disposable item; and
   generating at least one additional disposable material template using the modification factor.

5. The method of claim 1, wherein restricting access to the at least one disposable material template further comprises limiting variation of the at least one disposable material template by a predefined threshold, wherein limiting variation includes limiting variation of any pre-defined quantities for the disposable items to the predefined threshold.

6. The method of claim 1, wherein restricting access to the at least one disposable material template further comprises preventing alteration of the at least one disposable material template.

7. The method according to claim 1, further comprising an act of limiting disposable material selection by a user to at least one predetermined brand.

8. The method according to claim 1, further comprising an act of providing a plurality of automobile objects, wherein the act of providing the plurality of automobile objects includes an act of defining for an automobile object a set of disposable items used in repair of an automobile part and at least one of at least one modification factor to derive a quantity of each one of the set of disposable items and a quantity for each one of the set of disposable items.

9. The method according to claim 8, further comprising an act of generating disposable material templates using the plurality of automobile objects.

10. The method according to claim 1, wherein the project comprises work associated with an automobile.

11. The method according to claim 10, further comprising:
providing for submission of at least one variation to the disposable material templates including at least one of modification of a quantity for a disposable item, removal of a disposable item, and additional of a disposable item; and
determining the requested at least one variation meets a predetermined threshold.

12. The method according to claim 1, further comprising an act of generating an invoice for the project based on the selected at least one disposable material template.

13. The method according to claim 12, wherein the act of generating an invoice for the project based on the selected at least one disposable material template occurs in response to the act of determining the requested variations meets a predetermined threshold.

14. The method according to claim 7, wherein the act of limiting disposable material selection by a user to at least one predetermined brand, further includes an act of providing a subset of available brands.

15. A non-transitory computer-readable medium having computer-readable signals stored thereon that define instructions that, as a result of being executed by a computer, instruct the computer to perform a method for standardizing accounting of disposables, the method comprising acts of:
providing at least one disposable material template for a project, wherein the act of providing at least one disposable material template for the project includes an act of providing at least one predefined quantity for a disposable item used in the project, wherein the disposable item is associated with an automobile part undergoing repair;
providing an interface configured to generate an invoice associated with the project, wherein the user interface is further configured to accept user input associated with a repair project;
receiving, by the computer system, input information associated with the project, including an automobile part to repair;
selecting the at least one disposable material template in response to user input to identify at least one automobile part to be repaired, wherein the at least one disposable material template defines a plurality of disposable items and a quantity associated with each of the plurality of disposable items, wherein the plurality of consumable disposable items are used to effect the repair of a vehicle with the at least one automobile part, and wherein the plurality of disposable items are disposed during the course of one or more repairs of the at least one automobile part for one or more vehicles;
restricting access to the at least one disposable material template, wherein the act of restricting access to the at least one disposable material template includes an act of limiting, by the computer system, alteration of the quantities associated with the plurality of disposable items;
calculating, automatically, cost of the repair, based, at least in part, on the selected disposable items to be used for the repair from the selected disposable material templates; and
displaying a repair cost to the user and displaying the selected disposable items to be used for the repair.

16. The computer readable medium of claim 15, wherein the method further comprises an act of generating an invoice for the project based on the selected at least one disposable material template.

17. The computer readable medium of claim 15, wherein restricting access to the at least one disposable material template further comprises limiting variation of the at least one disposable material template by a predefined threshold, wherein the act of limiting variation includes limiting variation of any pre-defined quantities for the disposable items to the predefined threshold.

18. The computer readable medium of claim 15, wherein restricting access to the at least one disposable material template further comprises preventing alteration of the at least one disposable material template.

19. The computer readable medium of claim 15, wherein the method further comprises:
providing for submission of variations to the disposable material templates, including at least one of modification of a quantity for a disposable item, removal of a disposable item, and additional of a disposable item; and
determining the requested variations meet a predetermined threshold.

20. A system for standardizing accounting of disposables and capturing indirect costs, the system comprising:
at least one processor operatively connected to a memory, the processor when executing provides:
a user interface configured to accept user input associated with a repair project;
a storage component configured to store and retrieve at least one disposable material template associated with a project, wherein the storage component is further configured to retrieve at least one the disposable material template associated with a project including retrieval of at least one predefined quantity for a disposable item used in the project, wherein the disposable item is associated with an automobile part undergoing repair, wherein the disposable item is used to effect the repair of a vehicle with the associated automobile part, and wherein the disposable item is disposed during the course of one or more repairs of the associated automobile part for one or more vehicles, and wherein the storage component is further configured to retrieve the at least one disposable material template responsive to the identification of at least one automobile part to be repaired;
an analysis engine configured to select the at least one disposable material template in response to user input, wherein the at least one disposable material template defines a plurality of disposable items and a quantity associated with each of the plurality of disposable items;
an administration component configured to define user roles, wherein the administration component is further configured to:
restrict access to the at least one disposable material template, and
limit alteration of the quantities associated with the plurality of disposable items;
an account component configured to automatically calculate cost of the repair, based, at least in part, on the selected disposable items to be used for the repair from the selected disposable material templates; and
a display component configured to display a repair cost to the user and display the selected disposable items to be used for the repair.

21. The system of claim 20, wherein the storage component is further configured to store at least one disposable material template generated from direct measurements of quantities of each of the plurality of disposable items used in the repair of the automobile part.

22. The system of claim 21, wherein the analysis engine is further configured to derive at least one additional disposable material template and quantities for the plurality of disposable items from recorded measurements.

23. The system of claim 21, wherein the analysis engine is further configured to:
- compare characteristics of project targets including at least physical characteristics of a first automobile part and physical characteristics of a second automobile part,
- derive a modification factor for at least one known quantity for a disposable item used to repair the first automobile part;
- apply the modification factor to the at least one known quantity for the disposable item used to repair the first automobile part, to derive a quantity for the disposable item used to repair the second automobile part, and
- generate at least one additional disposable material template including the derived quantity for the disposable item used to repair the second automobile part using the modification factor.

24. The system of claim 20, wherein the administration component is further configured to limit variation of the at least one disposable material template by a predefined threshold, wherein limiting variation includes limiting variation of any pre-defined quantities for the disposable items to the predefined threshold.

25. The system of claim 20, wherein the administration component is further configured to prevent alteration of the at least one disposable material template.

26. The system of claim 20, further comprising a brand selection component configured to limit disposable material selection by a user to at least one predetermined brand.

27. The system of claim 20, further comprising an automobile object defining a set of disposable items used in repair of an automobile part and at least one of at least one modification factor to derive a quantity of each one of the set of disposable items and a quantity for each one of the set of disposable items.

28. The system of claim 27, wherein the analysis engine is further configured to generate at least one additional disposable material template using the automobile object.

29. The system of claim 20, wherein the project comprises work associated with an automobile.

30. The system of claim 29, wherein the user interface is further configured to:
- accept submission of variations to the at least one disposable material template, including at least one of modification of a quantity for a disposable item, removal of a disposable item, and additional of a disposable item; and
- wherein the analysis engine is further configured to determine whether the requested variations meet a predetermined threshold.

* * * * *